UNITED STATES PATENT OFFICE.

JOHN H. ELLIS, OF BOSTON, ASSIGNOR TO HIMSELF AND STEPHEN K. ELLIS, OF WALTHAM, MASSACHUSETTS.

IMPROVEMENT IN LINIMENTS.

Specification forming part of Letters Patent No. 211,390, dated January 14, 1879; application filed November 22, 1878.

*To all whom it may concern:*

Be it known that I, JOHN H. ELLIS, of Boston, in the county of Suffolk and State of Massachusetts, have invented a Liniment for Horses, &c., of which the following is a full, clear, and exact description.

This invention has for its object the cure of such diseases as spavin, ring-bone, spring-halt, &c., to which horses are subject; and consists in a liniment composed of lamb-laurel, (*Kalmia angustifolia*) chamber-lye, saltpeter, alcohol, and herb spearmint, compounded and put together as follows:

I take fifteen pounds, more or less, of lamb-laurel and sixty gallons of chamber-lye, and place them in a suitable vessel over a fire, and boil the same down to about ten gallons, and set it away to cool; and after the same has become cold I add one-half pound of saltpeter, one gallon of alcohol, and one-half pound of herb spearmint, and thoroughly incorporate the whole together by stirring, after which I filter the compound thus formed and bottle the same, when it is ready for use.

The above-mentioned liniment is to be used for the treatment of spavin, ring-bone, splints, spring-halt, rheumatism, and all sprains and bruises to which horses are liable.

In applying this compound bathe the parts morning and night with the liniment by rubbing with the hand or a sponge until cured.

What I claim as my invention, and desire to secure by Letters Patent, is—

A liniment for horses, &c., consisting of lamb-laurel, chamber-lye, saltpeter, alcohol, and herb spearmint, compounded and mixed in about the proportions specified, for the purpose set forth.

JOHN H. ELLIS.

Witnesses:
W. J. CAMBRIDGE,
J. E. CAMBRIDGE.